United States Patent
Jaffri et al.

(10) Patent No.: US 9,892,297 B2
(45) Date of Patent: Feb. 13, 2018

(54) ARRANGEMENT FOR, AND METHOD OF, PROCESSING PRODUCTS ASSOCIATED WITH RFID TAGS AND BAR CODE SYMBOLS AT THE SAME WORKSTATION

(71) Applicant: SYMBOL TECHNOLOGIES, LLC, Lincolnshire, IL (US)

(72) Inventors: Rehan K. Jaffri, New York, NY (US); Sean A. Connolly, Stony Brook, NY (US); Sean D. Marvel, Hampton Bays, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 19 days.

(21) Appl. No.: 15/149,800

(22) Filed: May 9, 2016

(65) Prior Publication Data
US 2017/0323128 A1  Nov. 9, 2017

(51) Int. Cl.
*G06K 7/10* (2006.01)
*G06K 7/00* (2006.01)
*G01G 19/414* (2006.01)
*G07G 1/00* (2006.01)

(52) U.S. Cl.
CPC ..... *G06K 7/10425* (2013.01); *G06K 7/10316* (2013.01); *G01G 19/4144* (2013.01); *G06K 7/0004* (2013.01); *G07G 1/0072* (2013.01)

(58) Field of Classification Search
CPC .......... G06K 7/10425; G06K 7/10316; G06K 7/0004; G01G 19/4144; G07G 1/0072
See application file for complete search history.

(56) References Cited

U.S. PATENT DOCUMENTS

| | | | | |
|---|---|---|---|---|
| 7,658,331 B1 * | 2/2010 | Barron | ................ | G07G 1/0018 235/462.01 |
| 7,850,085 B2 * | 12/2010 | Claessen | .............. | G06K 7/0004 235/462.13 |
| 2003/0024982 A1 * | 2/2003 | Bellis, Jr. | ................ | A47F 9/047 235/383 |
| 2003/0146280 A1 * | 8/2003 | Acosta | .............. | G06K 7/10693 235/454 |
| 2005/0234778 A1 * | 10/2005 | Sperduti | ................ | G06Q 20/20 705/22 |
| 2006/0146439 A1 * | 7/2006 | McIntosh | ........... | G11B 15/6835 360/92.1 |
| 2009/0101717 A1 * | 4/2009 | Claessen | .............. | G06K 7/0004 235/462.13 |
| 2009/0321518 A1 * | 12/2009 | Barron | .............. | G01G 19/4144 235/383 |
| 2014/0055249 A1 * | 2/2014 | Garner | ................ | G07G 1/0045 340/10.51 |

* cited by examiner

*Primary Examiner* — Thomas Alunkal
(74) *Attorney, Agent, or Firm* — Yuri Astvatsaturov

(57) ABSTRACT

A workstation has a metallic housing for supporting an electro-optical reader for reading bar code symbols. A radio frequency (RF) antenna of an RF identification (RFID) reader for reading RFID tags is mounted in a metallic container that is connected to the housing. The RF antenna radiates RF energy at a frequency greater than 900 MHz through RF excitation slots formed between the container and the housing.

20 Claims, 5 Drawing Sheets

ARRANGEMENT FOR, AND METHOD OF, PROCESSING PRODUCTS ASSOCIATED WITH RFID TAGS AND BAR CODE SYMBOLS AT THE SAME WORKSTATION

BACKGROUND OF THE INVENTION

The present disclosure relates generally to an arrangement for, and a method of, processing products associated with bar code symbols and/or radio frequency (RF) identification (RFID) tags, and, more particularly, to a point-of-transaction, checkout workstation through which the products are passed and processed, while the associated symbols and/or RFID tags are read at the same workstation.

In the retail industry, it is known to read targets, such as one-dimensional bar code symbols, particularly of the Universal Product Code (UPC) type, and two-dimensional bar code symbols, such as Quick Response (QR) codes, associated with, or borne on, retail products or items that are passed through, and processed by, various types of workstations, such as a flat bed scanner having a single horizontal window, or a vertical slot scanner having a single upright window, or a bi-optical scanner having dual horizontal and upright windows. Each such workstation can have either laser-based or imager-based readers for electro-optically reading the symbols passed by, or presented to, either or both windows, and each such workstation is typically fixedly installed and stationarily mounted in a checkout counter.

RFID systems for reading targets are also known and are commonly utilized for product locating, product tracking, product identification, and inventory control in manufacturing, warehouse, retail environments, and like venues. Briefly, an RFID system includes two primary components: an RFID reader (also known as an interrogator), and an RFID tag (also known as a transponder). The tag is a miniature device associated with, or attached to, a product to be monitored and is capable of responding, via a tag antenna, to an electromagnetic RF interrogating wave wirelessly propagated by an RF antenna of the reader. The tag responsively generates and wirelessly propagates an electromagnetic RF return wave back to the reader antenna. The return wave is modulated in a manner that conveys identification data (also known as a payload) from the tag back to the reader. The identification data can then be stored, processed, displayed, or transmitted by the RFID reader as needed.

It has become increasingly common in some venues to provide RFID tags in close proximity to symbols on products, or on shipping cartons containing the products, or on transport pallets that support the products and/or cartons, because the RFID reader can complement the symbol reader in reducing time and labor involved in a number of locating, tracking, identification, and inventory control processes, and can also provide a higher level of accuracy as compared to only relying on the symbol reader when implemented in certain areas of the venue. One such area is checkout, where an electro-optical symbol reader in a stationary workstation is operated to read symbols, and where a separate RFID reader is separately operated to read RFID tags. The RFID reader can advantageously confirm that the products being checked out should be removed from inventory. The RFID reader and the symbol reader are typically contained in separate housings that are remote from each other. For example, the RFID reader can be stationarily mounted overhead on a ceiling of the venue above the workstation, or the RFID reader can be implemented as a portable, mobile device that is movable towards and away from the workstation. The mobile device is typically supported in an operator's hand during use, or is mounted either directly, or in a cradle mounted, on the counter, during non-use.

Although the known symbol and RFID readers are generally satisfactory for their intended reading purposes, the operator needs to operate two different readers at two different times. This not only requires a skilled operator, but also slows down the checkout process, which is undesirable not only from the retailer's, but also from the customer's, point of view. The workstation typically has a housing principally constituted of metal walls that form a metallic chassis. Heretofore, the RFID reader, and particularly its RF antenna, was not integrated with the symbol reader at the same workstation, because the metal housing walls would attenuate, or sometimes even block, the RF interrogating and return waves, thereby degrading the tag reading performance.

Accordingly, it would be desirable to integrate a symbol reader and an RF antenna of an RFID reader at the same workstation, to enable the same workstation to read both symbols and/or RFID tags despite the metal walls of the workstation, and to expedite the overall checkout process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
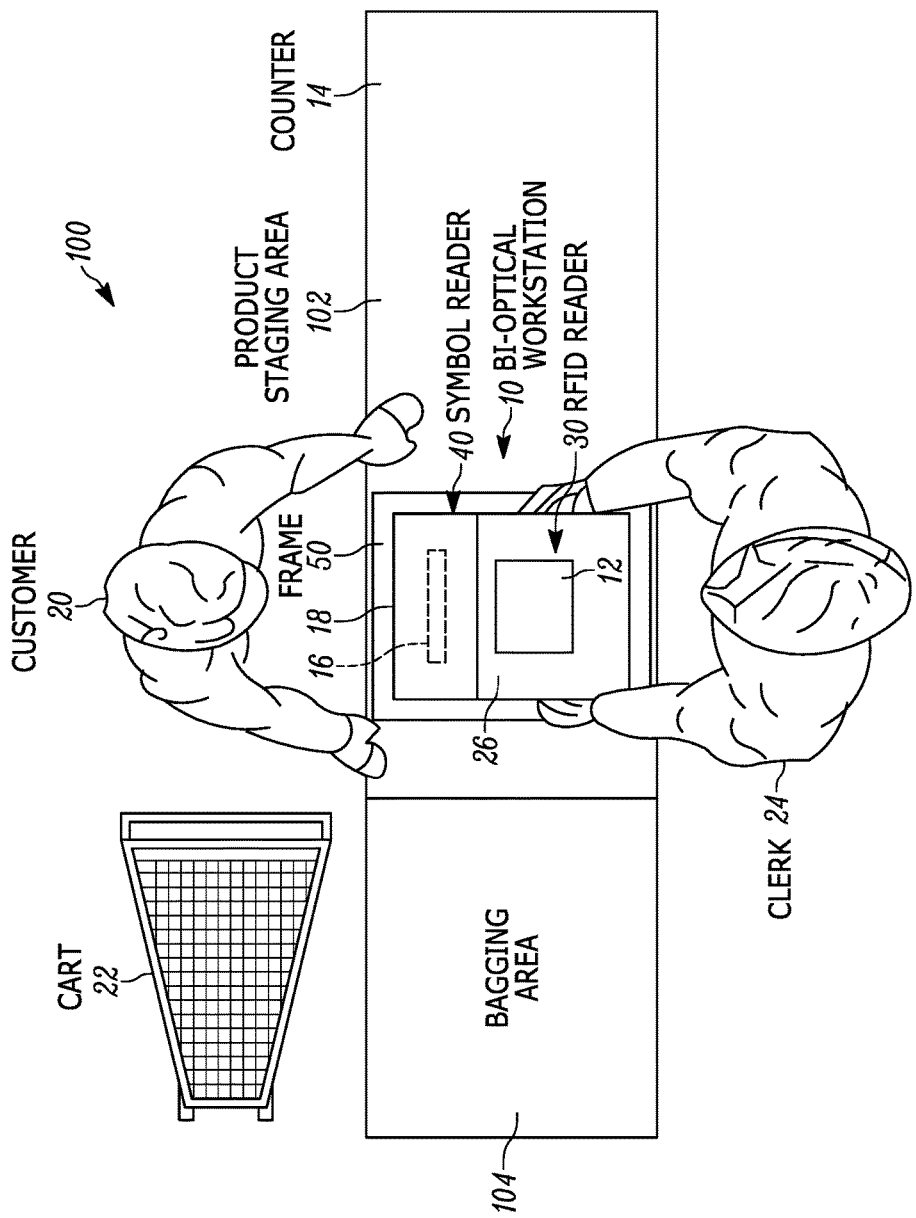
FIG. 1 is a schematic, overhead view of a bi-optical workstation installed in a retail checkout counter, the workstation being equipped with a bar code symbol reader and with an RFID reader in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement, workstation, and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure generally relates to an arrangement or workstation for processing products associated with targets to be read as they pass through the workstation. The workstation includes a window constituted of a material, such as glass or plastic, that is transmissive to light, and a housing or chassis that supports the window. The housing has housing walls constituted of an electrically conductive material, such as metal. An electro-optical reader is supported by the housing and is operative for reading the targets configured as bar code symbols by detecting return light returning from the symbols and passing through the window. A container is mounted exteriorly of the housing in a mounted position. The container has container walls also constituted of an electrically conductive material, such as metal. The electrically conductive container walls bound at least one radio frequency (RF) excitation slot, and preferably a pair of such RF excitation slots, with the electrically conductive housing walls in the mounted position. An RF identification (RFID) reader includes an RF antenna mounted in the container. The RF antenna is operative for radiating and receiving RF electromagnetic energy at a frequency greater than 900 MHz. The RFID reader is operative for reading the targets configured as RFID tags by transmitting the RF energy radiated by the RF antenna and reflected by the electrically conductive container walls through one or both of the RF excitation slots away from the container to the tags, and by detecting return RF energy returning from the tags through one or more of the RF excitation slots and received by the RF antenna in the container.

Advantageously, the electrically conductive housing walls are spaced apart by a first distance along an advancement direction in which the products are processed and advanced past the window, and the electrically conductive container walls are also spaced apart along the advancement direction by a second distance greater than the first distance to bound the RF excitation slots that are spaced apart along the advancement direction. The window lies in a generally horizontal plane, and the RF excitation slots preferably lie in the same plane as the window. The electrically conductive container walls reflect the RF energy radiated by the RF antenna through the RF excitation slots along a direction that is generally perpendicular to the plane of the window. The RF antenna can be a loop antenna, a dipole, or a like radiator, and is mounted inside the container, and more than one RF antenna can be employed.

In a preferred embodiment, the workstation is a bi-optical workstation whose housing includes a horizontal bed for supporting the window, and an upright raised tower for supporting another window that is also transmissive to the light. An electrically conductive frame surrounds the bed and is spaced therefrom by a gap. The RF excitation slots are situated at opposite sides of the bed and are in open communication with the gap. Thus, the RF energy exits and/or enters the gap outside the workstation. The RFID reader includes an RF control module that is mounted outside or inside the container that is preferably located underneath the workstation. The RF control module controls a transmit power of a transceiver connected to the RF antenna to limit the effective radiated power (ERP) so that the RF antenna radiates the RF energy over a reading zone of limited range relative to the housing. The electro-optical reader is operative for reading the symbols over a reading field, and the RFID reader is operative for reading the RFID tags over a reading zone that preferably at least partly overlaps the reading field.

Still another aspect of the present disclosure relates to a method of processing products associated with targets to be read. The method is performed by supporting a window constituted of a material transmissive to light on a housing having housing walls constituted of an electrically conductive material, and by electro-optically reading the targets configured as bar code symbols by detecting return light returning from the symbols and passing through the window. The method is further performed by mounting a container having container walls constituted of an electrically conductive material exteriorly of the housing in a mounted position, by spacing the electrically conductive container walls away from the electrically conductive housing walls in the mounted position to bound at least one radio frequency (RF) excitation slot, by mounting in the container an RF antenna for radiating and receiving RF electromagnetic energy at a frequency greater than 900 MHz, and by reading the targets configured as RF identification (RFID) tags by transmitting the RF energy radiated by the RF antenna and reflected by the electrically conductive container walls through the at least one RF excitation slot away from the container to the tags, and by detecting return RF energy returning from the tags through the at least one RF excitation slot and received by the RF antenna in the container.

In accordance with this disclosure, a symbol reader and at least an RF antenna of an RFID reader are both integrated at the same workstation, and the same workstation can read both symbols and/or RFID tags despite the metal walls of the workstation. The overall checkout process is expedited, because the symbol and RFID readers are not separately operated at two different times. In fact, both the symbols and the RFID tags can be simultaneously read.

Figure 2:
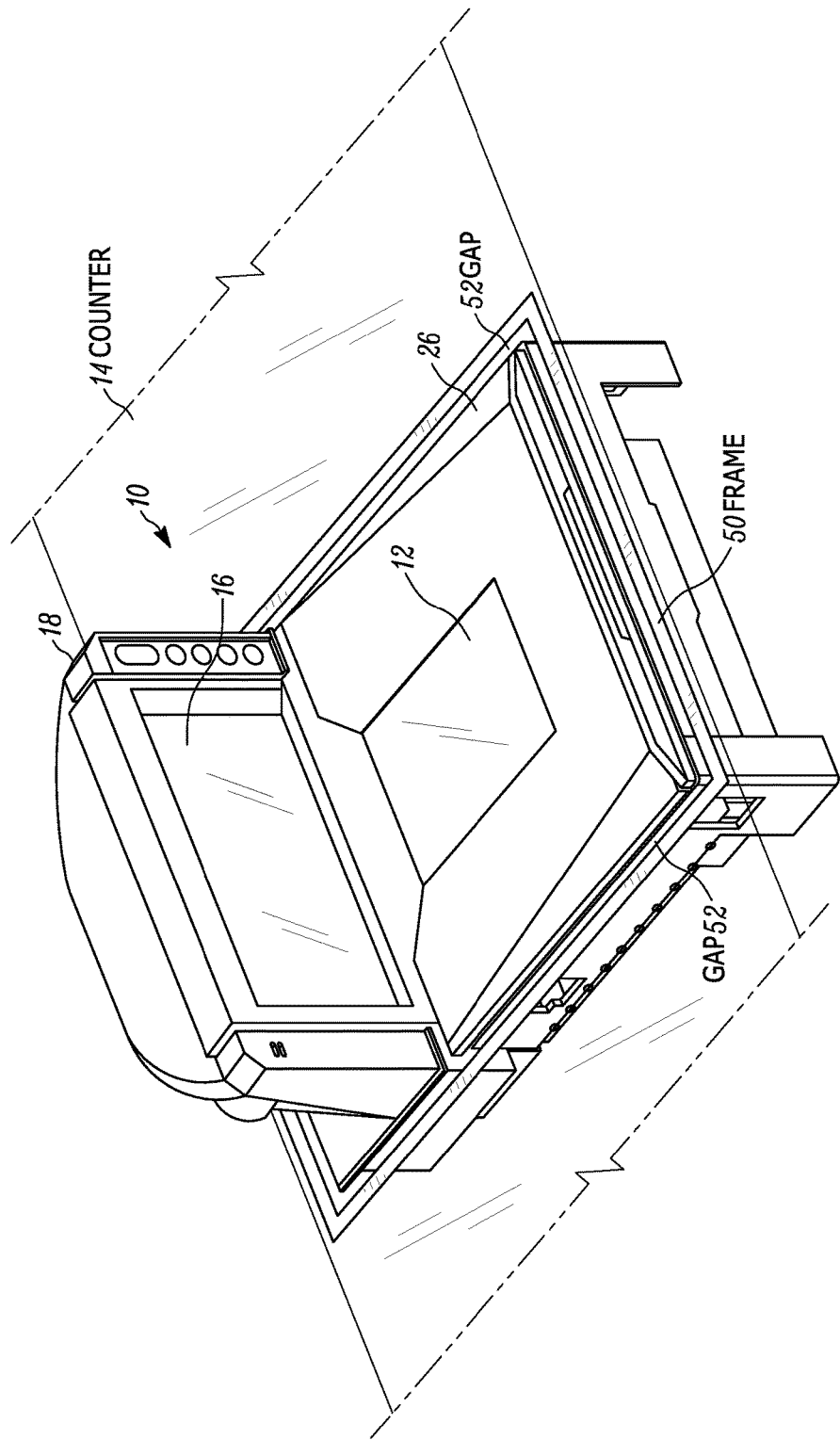
FIG. 2 is a broken-away, perspective, more realistic view of the workstation of FIG. 1 at the checkout counter.

Turning now to the drawings, a retail checkout system 100, as depicted in FIG. 1, includes a dual window, multi-plane, bi-optical, point-of-transaction, retail workstation 10 used by retailers at a retail checkout counter 14 in an aisle to process transactions involving the purchase of retail products associated with, or bearing, an identifying target, such as the symbols described above. In a typical retail venue, a plurality of such workstations 10 is arranged in a plurality of checkout aisles. As best seen in FIG. 2, the workstation 10 has a generally horizontal, planar, generally rectangular, bed window 12 supported by a horizontal bed 26. The bed window 12 is either elevated, or set flush, with the counter 14. A generally rectangular frame 50 constituted of an electrically conductive material, such as metal, surrounds the bed 26 and forms a generally rectangular gap 52 therewith. A vertical or generally vertical, i.e., slightly tilted, (referred to as "upright" hereinafter) planar, generally rectangular, tower window 16 is set flush with, or, as shown, recessed into, a raised tower 18 above the counter 14. The workstation 10 either rests directly on the counter 14, or preferably, the frame 50 and workstation 10 both rest in a cutout or well formed in the counter 14.

Figure 3:
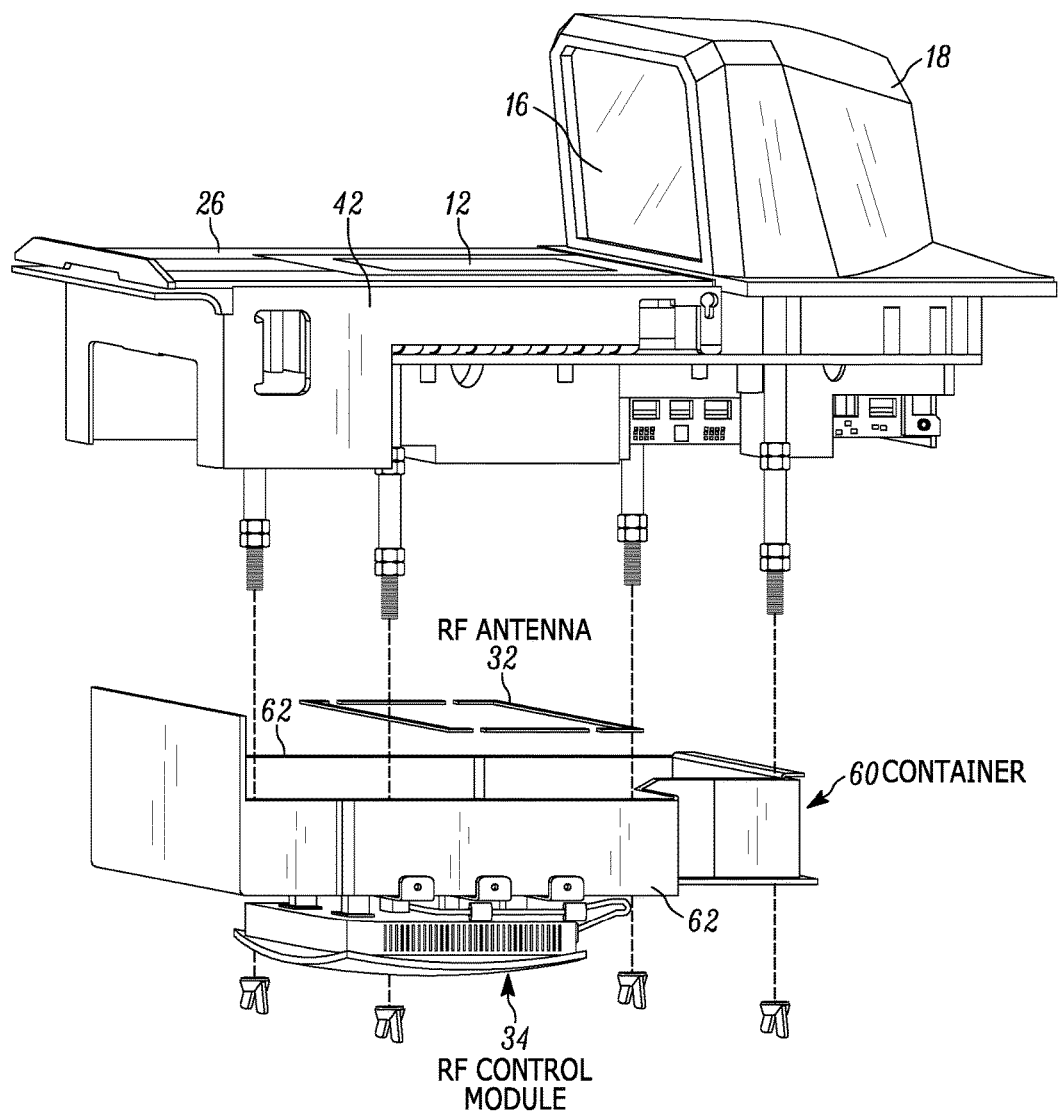
FIG. 3 is a perspective, exploded, view depicting how an RF antenna of the RFID reader is installed at the workstation of FIG. 2.
Figure 4:
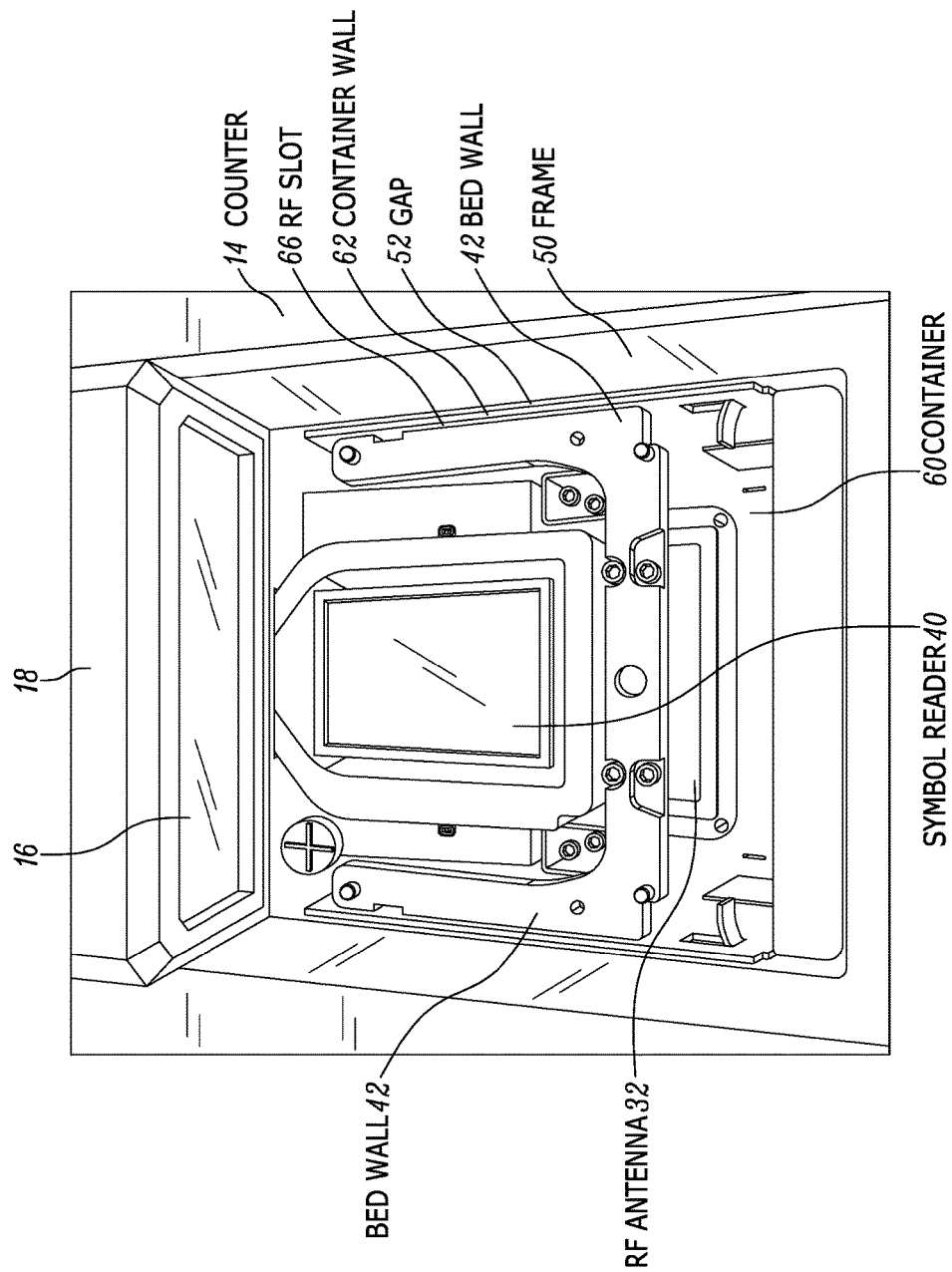
FIG. 4 is a perspective view of the interior of the workstation of FIG. 2.
Figure 5:
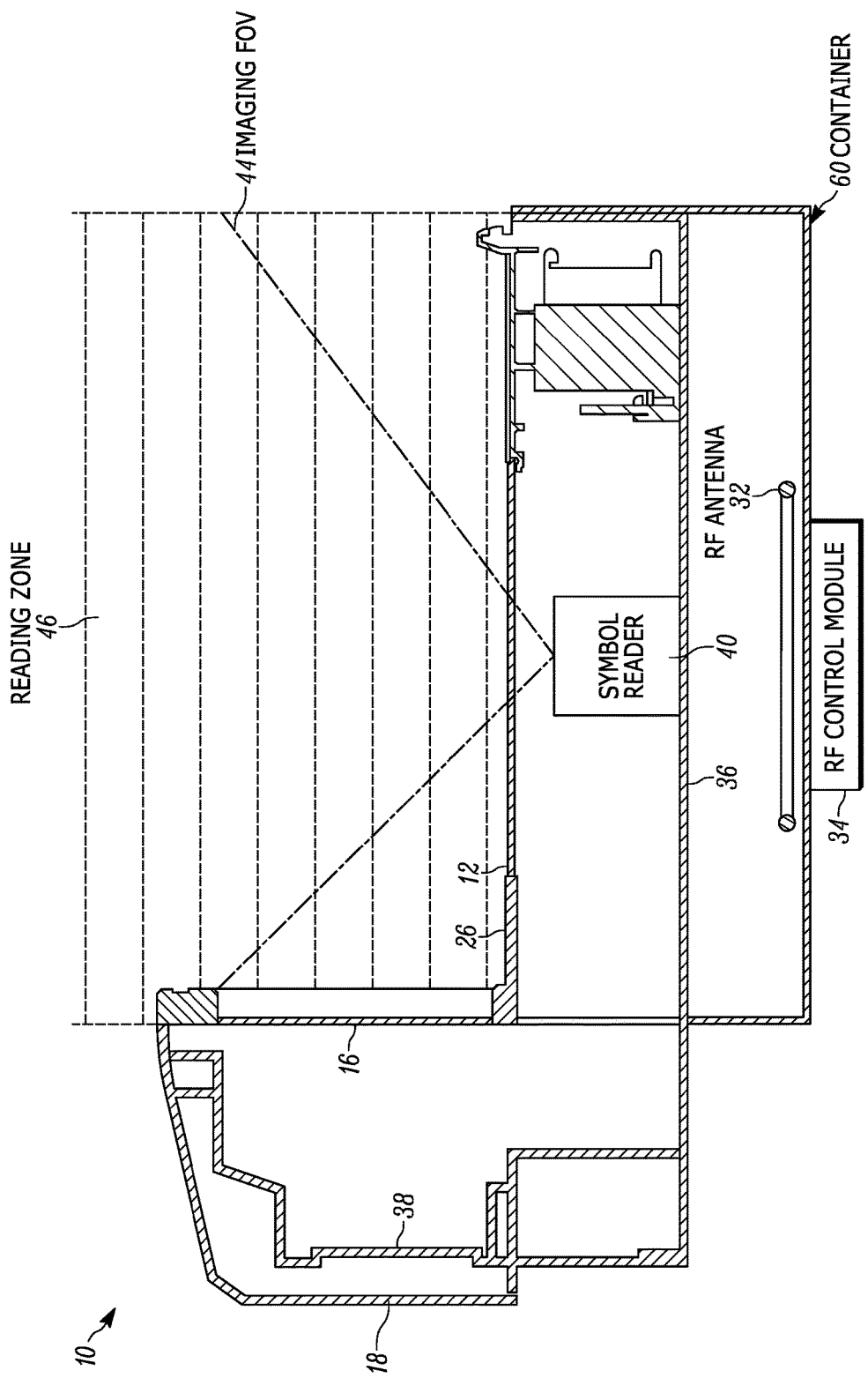
FIG. 5 is a sectional view of the workstation of FIG. 2.

As best seen in FIG. 5, the bed 26 has a generally planar, base or horizontal bottom wall 36, and the tower 18 has a generally planar, back or upright rear wall 38. As best seen in FIGS. 3-4, the bed 26 also has a pair of upright side walls 42. All the walls of the workstation 10 are constituted of an electrically conductive material, such as metal. Both the bed and tower windows 12, 16 are typically positioned to face and be accessible to a clerk 24 (FIG. 1) standing at one side of the counter 14 for enabling the clerk 24 to interact with the workstation 10. Alternatively, in a self-service checkout, the bed and tower windows 12, 16 are typically positioned to face and be accessible to a customer 20.

FIG. 1 also schematically depicts that a product staging area 102 is located on the counter 14 at one side of the workstation 10. The products are typically placed on the product staging area 102 by the customer 20 standing at the opposite side of the counter. The customer 20 typically retrieves the individual products for purchase from a shopping cart 22 or basket for placement on the product staging area 102. A non-illustrated conveyor belt could be employed for conveying the products to the clerk 24.

FIGS. 1 and 5 schematically depict that the workstation 10 has a bar code symbol reader 40, for example, a plurality of imaging readers, each including a solid-state imager for capturing light passing through either or both windows 12, 16 from a one- or two-dimensional symbol over an imaging field of view (FOV) 44. In typical use, the clerk 24 may process each product bearing a UPC symbol thereon, past the windows 12, 16 by swiping the product across a respective window, or by presenting the product by holding it momentarily steady at the respective window, before passing the product to a bagging area 104 that is located at the opposite side of the workstation 10. The symbol may be located on any of the top, bottom, right, left, front and rear, sides of the product, and at least one, if not more, of the imagers will capture the return light returning from the symbol through one or both windows 12, 16 as an image.

In accordance with this disclosure, a tub or container 60, as shown in FIGS. 3-5, is mounted exteriorly of the housing in a mounted position underneath the bottom wall 36 of the bed 26. The container 60 has a box-like shape with an open top facing the bottom wall 36, and has a pair of container side walls 62 constituted of an electrically conductive material, such as metal. The electrically conductive container walls 62 bound at least one, and preferably a pair of, radio frequency (RF) excitation slots 66 with the electrically conductive housing walls 42 in the mounted position. The RFID reader 30 includes an RF antenna 32 mounted in the container 60 and operative for radiating RF energy at a frequency greater than 900 MHz in a transmit mode, and for receiving return RF energy at a frequency greater than 900 MHz in a receive mode. The container walls 62 reflect any incident RF energy radiated by the RF antenna 32 and act as a waveguide to direct the radiated RF energy to and through the slots 66 and, in turn, to and through the aforementioned gap 52. As described below, the RFID reader 30 is operative for reading the targets configured as RFID tags by transmitting the RF energy radiated by the RF antenna 32 and reflected by the electrically conductive container walls 62 through each RF excitation slot 66 and the gap 52 away from the container 60 to the tags in the transmit mode, and by detecting return RF energy returning from the tags through the gap 52 and each RF excitation slot 66 and received by the RF antenna 32 in the container 60 in the receive mode.

As previously mentioned, either or both windows 12, 16 is transmissive to light, for example, is constituted of glass or plastic. In the case of imaging readers, an illumination source emits illumination light in one direction through the windows 12, 16, and the return illumination light that is reflected and/or scattered from the symbol passes in the opposite direction to the imagers. In the case of moving laser beam readers, a laser emits laser light in one direction through the windows 12, 16, and the return laser light that is reflected and/or scattered from the symbol passes in the opposite direction to a photodetector.

The bed 26 and the tower 18 of the workstation 10 together comprise a housing or chassis for supporting the windows 12, 16. The housing has housing walls constituted of an electrically conductive material, such as metal. The housing may be formed in sheet or cast metal, such as aluminum, steel, zinc, magnesium, or a metal-coated structural member. As previously mentioned, such metal housing walls could attenuate, or sometimes even block, the RF interrogating and return waves, and degrade the RFID reader performance. However, in accordance with this disclosure, the metal housing walls are used to advantage, and the RF antenna 32 is positioned such that there is little, or no, degradation in the performance of the RFID reader.

As shown in FIGS. 3-5, the RF antenna 32 is mounted underneath the housing in the container 60. The RF antenna 32 is shown in FIG. 3 as a generally rectangular loop that is constituted of a flexible conductor, e.g., a metal wire of approximately 20 AWG (American Wire Gauge). Although the loop is illustrated as having a generally rectangular contour, it will be understood that the loop may have other contours, such as generally circular, oval, or other polygonal shapes. The RF antenna 32 need not be a loop, but can be a dipole, or any other RF radiator. The RF antenna 32 could also be a conductive strip applied on a printed circuit board. More than one RF antenna could be positioned in the container 60. Each antenna can be oriented in either a horizontal or an upright plane. An antenna can be positioned directly underneath each slot 66.

The container 60 bounds an interior cavity or metallic enclosure in which the RF antenna 32 is mounted. When the RF antenna 32 radiates RF energy, the RF energy initially fills the cavity, and then passes and spills out of the cavity through the excitation slots 66. The metal walls 62 of the container 60 assist in reflecting the radiated RF energy through the slots 66 and the gap 52 along a direction that is generally perpendicular to the plane of the window 12. As an alternative, or in addition, to positioning the RF antenna 32 in a horizontal plane underneath the bottom wall 36, the container 60 and the RF antenna 32 can be positioned in a vertical plane in the tower 18, in which case, the metal walls 62 of the container 60 would reflect the radiated RF energy along a direction that is generally perpendicular to the plane of the window 16.

The metal housing walls 42 are spaced apart by a first distance along an advancement direction in which the products are processed and advanced past the windows 12, 16. The metal container walls 62 are spaced apart along the advancement direction by a second distance greater than the first distance to bound the RF excitation slots 66 that are also spaced apart along the advancement direction. The RF excitation slots 66 lie in the same plane as the window 12, and the metal container walls 62 reflect the RF energy radiated by the RF antenna 32 through the RF excitation slots 66 and the gap 52 along a direction that is generally perpendicular to the plane of the window 12. An RFID tag can be read when entering either side of the workstation 10.

The RF energy preferably lies in the industrial, scientific, and medical (ISM) frequency band of about 902 MHz to about 928 MHz. The wavelength at such frequencies is about thirteen inches. Each slot 66 is preferably dimensioned to be greater than a half-wavelength, i.e., greater than about 6.5 inches. The size of the container 60 can be adjusted by providing a movable container wall.

As shown in FIGS. 3 and 5, the RFID reader 30 includes an RF control module 34 for controlling, among other things, a transmit power of a transceiver connected to the RF antenna 32 to limit the effective radiated power (ERP) so that the RF antenna 32 radiates the RF energy over a reading zone of limited range, for example, less than ten inches, above the plane of the window 12. Unless so controlled, the RF reader might read RFID tags that are not of interest, for example, tags located on products on shelves in the venue. The RFID reader is thus controlled to read only tags of interest, i.e., tags at the workstation 10. The RF control module 34 may be mounted inside or outside the container 60.

As also shown in FIG. 5, the symbol reader 40 is operative for reading the symbols over a reading field, such as the imaging field of view 44, and the RFID reader is operative for reading the RFID tags over a reading zone 46 that at least partly overlaps the imaging field of view 44. The workstation 10 is operatively connected, either by a wired or a wireless connection, to a remote host server (not illustrated), and the data read by the symbol reader and/or by the RFID reader is advantageously sent to the host server over a shared, common connection to avoid having to install additional connectors on the workstation.

In the foregoing specification, specific embodiments have been described. However, one of ordinary skill in the art appreciates that various modifications and changes can be made without departing from the scope of the invention as set forth in the claims below. Although the workstation 10 has been illustrated as a dual-window workstation, it will be understood that the readers 30, 40 could be installed at other types of workstations, for example, a flat bed scanner having a single horizontal window, or a vertical slot scanner having a single upright window. Any metal materials used in the workstation 10, or the container 60, or the frame 50 may be formed in sheet or cast metal, such as aluminum, steel, zinc, magnesium, or a metal-coated structural member. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for processing products associated with targets to be read, the arrangement comprising:
    a window constituted of a material transmissive to light;
    a housing for supporting the window, the housing having housing walls constituted of an electrically conductive material;
    an electro-optical reader supported by the housing and operative for reading the targets configured as bar code symbols by detecting return light returning from the symbols and passing through the window;
    a container mounted exteriorly of the housing in a mounted position, the container having container walls constituted of an electrically conductive material, the electrically conductive container walls bounding at least one radio frequency (RF) excitation slot with the electrically conductive housing walls in the mounted position; and
    an RF identification (RFID) reader including an RF antenna mounted in the container and operative for radiating and receiving RF electromagnetic energy at a frequency greater than 900 MHz, the RFID reader being operative for reading the targets configured as RFID tags by transmitting the RF energy radiated by the RF antenna and reflected by the electrically conductive container walls through the at least one RF excitation slot away from the container to the tags, and by detecting return RF energy returning from the tags through the at least one RF excitation slot and received by the RF antenna in the container.

2. The arrangement of claim 1, wherein the electrically conductive housing walls are spaced apart by a first distance along an advancement direction in which the products are processed and advanced past the window, and wherein the electrically conductive container walls are spaced apart along the advancement direction by a second distance greater than the first distance to bound a pair of RF excitation slots that are spaced apart along the advancement direction.

3. The arrangement of claim 2, wherein the window lies in a generally horizontal plane, and wherein the RF excitation slots lie in the same plane as the window, and wherein the electrically conductive container walls reflect the RF energy radiated by the RF antenna through the RF excitation slots along a direction that is generally perpendicular to the plane of the window.

4. The arrangement of claim 2, wherein the electrically conductive housing walls include a bed for supporting the window in a generally horizontal plane, and an electrically conductive frame surrounding the bed and spaced therefrom by a gap, and wherein the RF excitation slots are situated at opposite sides of the bed and are in open communication with the gap.

5. The arrangement of claim 4, wherein the electrically conductive housing walls include an upright raised tower for supporting another light-transmissive in an upright plane, and wherein the electro-optical reader is operative for detecting return light returning from the symbols and passing through at least one of the windows.

6. The arrangement of claim 1, wherein the electrically conductive container walls bound an interior compartment, and wherein the RF antenna is mounted inside the interior compartment.

7. The arrangement of claim 1, wherein the container has an open top and is mounted underneath the housing.

8. The arrangement of claim 1, wherein the RFID reader includes an RF control module for controlling an effective radiated power of the RF antenna to radiate the RF energy over a reading zone of limited range relative to the housing.

9. The arrangement of claim 8, wherein the RF control module is exteriorly mounted on, and outside, the container.

10. The arrangement of claim 1, wherein the electro-optical reader is operative for reading the symbols over a reading field, and wherein the RFID reader is operative for reading the RFID tags over a reading zone that at least partly overlaps the reading field.

11. A method of processing products associated with targets to be read, the method comprising:
supporting a window constituted of a material transmissive to light on a housing having housing walls constituted of an electrically conductive material;
electro-optically reading the targets configured as bar code symbols by detecting return light returning from the symbols and passing through the window;
mounting a container having container walls constituted of an electrically conductive material exteriorly of the housing in a mounted position;
spacing the electrically conductive container walls away from the electrically conductive housing walls in the mounted position to bound at least one radio frequency (RF) excitation slot; and
mounting in the container an RF antenna for radiating and receiving RF electromagnetic energy at a frequency greater than 900 MHz;
reading the targets configured as RF identification (RFID) tags by transmitting the RF energy radiated by the RF antenna and reflected by the electrically conductive container walls through the at least one RF excitation slot away from the container to the tags, and by detecting return RF energy returning from the tags through the at least one RF excitation slot and received by the RF antenna in the container.

12. The method of claim 11, and spacing the electrically conductive housing walls apart by a first distance along an advancement direction in which the products are processed and advanced past the window, and spacing the electrically conductive container walls apart along the advancement direction by a second distance greater than the first distance to bound a pair of RF excitation slots that are spaced apart along the advancement direction.

13. The method of claim 12, and configuring the window to lie in a generally horizontal plane, and positioning the RF excitation slots to lie in the same plane as the window, and directing the RF energy radiated by the RF antenna and reflected by the electrically conductive container walls through the RF excitation slots along a direction that is generally perpendicular to the plane of the window.

14. The method of claim 12, and supporting the window in a generally horizontal plane on a bed, and surrounding the bed with an electrically conductive frame spaced from the bed by a gap, and situating the RF excitation slots at opposite sides of the bed and in open communication with the gap.

15. The method of claim 14, and supporting another light-transmissive in an upright plane, and wherein the reading of the symbols is performed by detecting the return light passing through at least one of the windows.

16. The method of claim 11, and mounting the RF antenna mounted inside an interior compartment of the container.

17. The method of claim 11, and mounting the container underneath the housing.

18. The method of claim 11, and controlling an effective radiated power of the RF antenna with an RF control module to radiate the RF energy over a reading zone of limited range relative to the housing.

19. The method of claim 18, and mounting the RF control module exteriorly on, and outside, the container.

20. The method of claim 11, wherein the reading of the symbols is performed over a reading field, and wherein the reading of the tags is performed over a reading zone that at least partly overlaps the reading field.

* * * * *